UNITED STATES PATENT OFFICE.

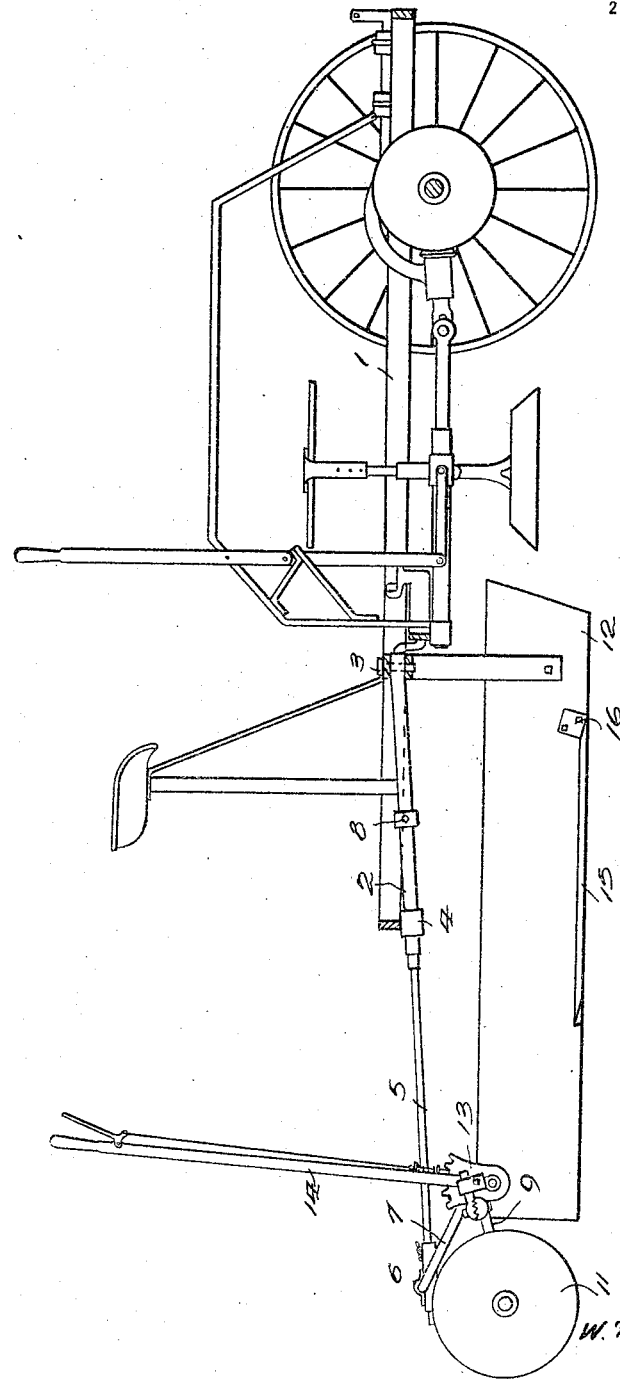

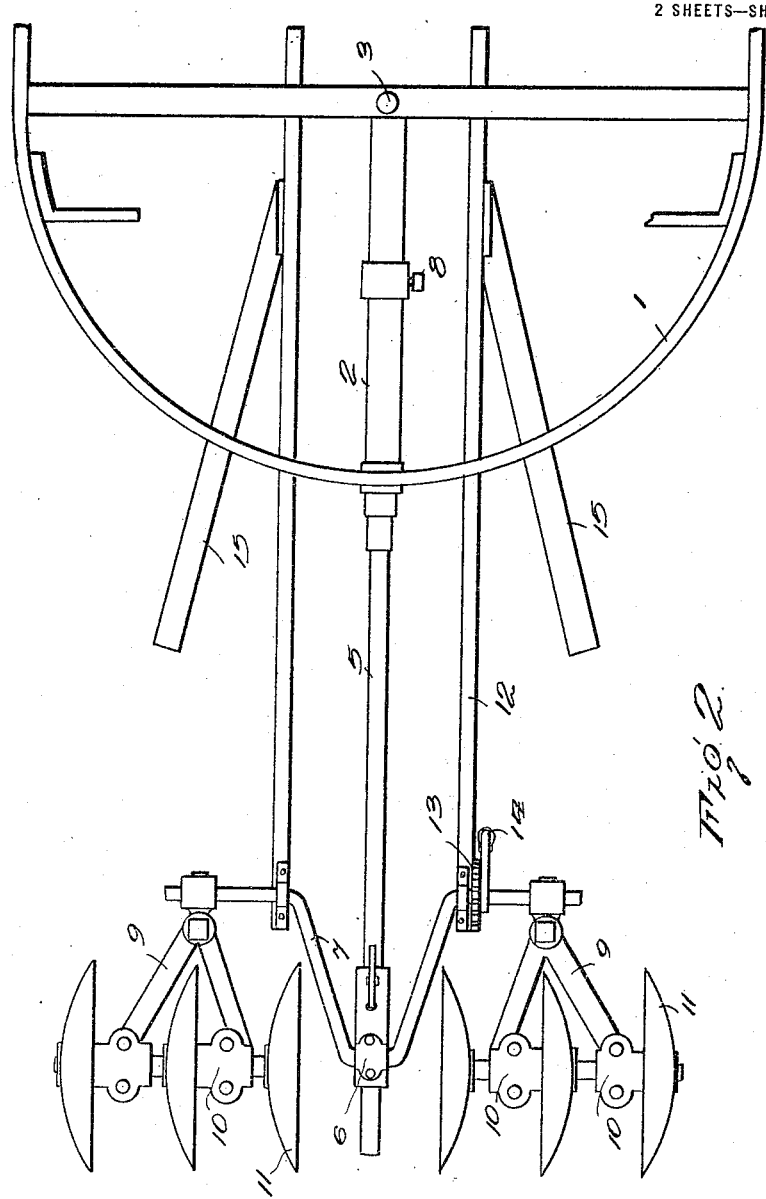

WILLIAM T. GOODMAN, OF GOODLET, TEXAS.

CULTIVATOR.

1,295,731.　　　　　　Specification of Letters Patent.　　Patented Feb. 25, 1919.

Original application filed January 24, 1918, Serial No. 213,529. Divided and this application filed April 27, 1918, Serial No. 231,145. Renewed January 16, 1919. Serial No. 271,507.

*To all whom it may concern:*

Be it known that I, WILLIAM T. GOODMAN, a citizen of the United States, residing at Goodlet, in the county of Hardeman and State of Texas, have invented certain new and useful Improvements in Cultivators, of which the following is a specification.

This invention relates to improvements in cultivators or weeders for use in connection with the type of cotton chopping machine such as shown and claimed in my pending United States application bearing Serial Number 213,529 and it is the principal object of the invention to provide a device whereby the soil of a field having cotton planted therein can be effectually turned and cleared of weeds and the portions of the cotton plant remaining thereon subsequently to the chopping of the same, thus, obviating the necessity of cultivating the land in a separate and later operation.

Another and equally important object of the invention is to provide a cultivator employing means for cutting all matter remaining in the soil at a point adjacent the surface of the same and then upturning the soil by means of earth working elements which are engaged therein.

Referring to the drawings:

Figure 1 is a side elevation showing parts in section, and

Fig. 2 is a fragmentary top plan view.

Having more particular reference to the drawings, in connection with which like reference characters will designate corresponding parts throughout the several views, 1 represents the wheeled frame of my improved cotton chopping machine claimed in my pending application Serial Number 213,529, which frame has a tubular arm 2 secured to the curved rear end 3 thereof and a suitable form of roller 4 mounted on the same and normally engaged with the lower marginal portion of said curved end 3. Slidably engaged in the tubular arm 2 is a rod 5, the outer end of which is provided with suitable bearings 6 for receiving a crank shaft 7 therein; the inner end of the rod being maintained in adjusted position with relation to the tubular arm 2 by means of locking screws 8 which are arranged on collars carried by portions of said arm 2 and adapted to pass through openings formed in the same into engagement with portions of said rod 5.

Supporting arms 9 are arranged on the opposite extremities of the crank shaft 7 and have bearings 10 formed in their ends whereby a plurality of disk cultivators 11 can be supported thereon, said cultivators of course being adapted for engagement with the soil over which the wheeled frame 1 travels.

Pivotally secured at their forward ends to a transversely disposed bar carried by the frame 1 are a pair of longitudinally disposed runners 12, which as will be noted, are arranged in spaced parallel relation and extend to points beyond the curved end of the frame 1. Secured to one side of one of the runners 12 is a toothed segment 13 which is adapted to be engaged by the usual locking pawl carried on an adjusting lever 14 fixedly mounted on the adjacent extremity of the crank shaft 7. Thus, by rocking the operating lever 14 it will be understood that the cultivating disks 11 can be raised or lowered with relation to the soil to be cultivated thereby and as a consequence, can be properly adjusted to the desired depth.

Diagonally disposed cutting arms 15 having upturned apertured bracket arms 16 formed on their forward extremities, secured to the forward opposite sides of the several runners 12 by passing suitable fastening devices through said apertured brackets 16; it being noted in this connection, that the cutting arms are arranged substantially flush with the lower marginal portions of said runners 12 and as a consequence will engage all matter in the soil upon movement of the runners thereover, thus effectually severing the same.

In using my improved cultivator, the frame of the cotton chopping machine which I have designated by the numeral 1 is of course connected to a suitable draft means and drawn or propelled over a field. Subsequently to the chopping of the cotton plants, the runners 12 will move over the soil and as a consequence the cutting arms 15 will be engaged with the weeds and those portions of the cotton plant remaining in the soil, thereby severing the same at points adjacent the surface of the soil. At this time, the disk cultivators 11 will serve to effectually upturn the soil and thereby clear the same of the weeds and remaining portions of the cotton plant. In this way, a separate cultivating operation is obviated since the soil is cultivated to the desired extent by my improved cultivator immediately subsequent to the chopping of the cotton plant by the machine preceding the same. Since the tubular arm 2 is pivotally connected to the machine frame 1 the roller 4 arranged thereon will move over the curved end 3 of the frame upon the turning thereof, hence, permitting the cultivator to remain in engagement with the soil until the end of the field at which the turn is made has been reached thereby. To adjust the disk cultivators 11, the locking screws 8 are loosened whereupon the lever 14 is rocked to the desired extent to cause the raising or lowering of the extremity of the crank shaft 7, thereby varying the engagement of the cultivators 11 with the soil.

Various matters shown and described in this application and not claimed herein are reserved for claiming in my pending application hereinbefore identified.

I claim:

1. A cultivator comprising in combination a wheeled frame having a curved rear end, a tubular arm pivotally connected to said frame, a roller carried on said arm engaged with the curved end of the frame, longitudinally disposed runners engaged with the frame, cultivating means adjustably carried on the runners, a rod connected to said cultivating means and slidably engaged in the tubular arm, and means for locking the rod in adjusted position in the tubular arm.

2. A cultivator comprising in combination a wheeled frame having a curved rear end, a tubular arm pivotally engaged with the frame, a roller carried by the arm engageable with the curved end of the frame, runners pivotally connected to the frame and disposed longitudinally thereof, angularly disposed cutting arms secured to the forward portions of the runners adjacent the lower marginal portions thereof, a crank shaft mounted on the rear extremities of the runners, earth working elements carried on the extremities of said crank shaft for imparting movement to the crank shaft, and a rod engaged with the crank shaft and slidable in said arm and engaged with locking means arranged thereon.

In testimony whereof, I affix my signature hereto.

WILLIAM T. GOODMAN.

Copies of this patent may be obtained for five cents each, by addressing the "Commissioner of Patents, Washington, D. C."